United States Patent [19]

Bragole

[11] Patent Number: 4,778,724
[45] Date of Patent: Oct. 18, 1988

[54] METHOD AND COMPOSITION FOR ENHANCING BONDING TO POLYOLEFIN SURFACES

[75] Inventor: Robert A. Bragole, Danvers, Mass.

[73] Assignee: Worthen Industries, Inc., Nashua, N.H.

[21] Appl. No.: 6,368

[22] Filed: Jan. 23, 1987

[51] Int. Cl.⁴ .............................................. B05D 3/06
[52] U.S. Cl. ................................. 428/414; 427/54.1; 428/424.8
[58] Field of Search ........................... 427/53.1, 54.1; 430/532; 428/414, 423.1, 424.8

[56] References Cited

U.S. PATENT DOCUMENTS

| | | | |
|---|---|---|---|
| 2,873,241 | 2/1959 | Strzyzewski et al. | 522/161 |
| 3,036,930 | 5/1962 | Grimminger et al. | 427/54.1 |
| 3,892,575 | 7/1975 | Watts et al. | 430/532 |
| 4,303,697 | 12/1981 | Baseden | 428/520 |

Primary Examiner—John H. Newsome
Attorney, Agent, or Firm—Samuels, Gauthier, Stevens & Kehoe

[57] ABSTRACT

A polyolefin primer is coated on and bonded to a polyolefin surface. The primer is irradiated and an adhesive is bonded to the primer. The irradiated surface significantly enhances the final bonding between the polyolefin and the adhesive.

13 Claims, 1 Drawing Sheet

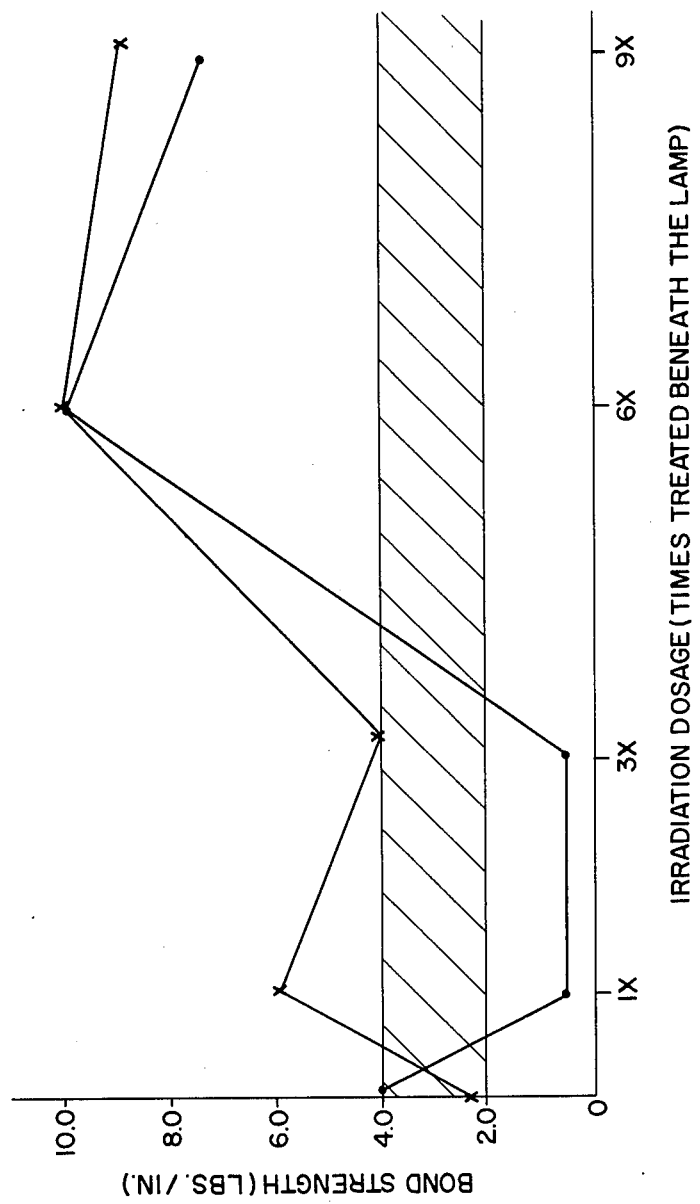

METHOD AND COMPOSITION FOR ENHANCING BONDING TO POLYOLEFIN SURFACES

BACKGROUND AND SUMMARY OF THE INVENTION

There have been several primers and processes developed over the years to improve the adhesion of materials to polypropylene and other polyolefins. Polyolefins are generally inert, paraffin-like polymeric substrates which are non-polar and very difficult to paint, coat or bond. They are further characterized as having low critical surface tensions of wetting, e.g., 35 dynes/cm or less which make them difficult to wet with paints, coatings and adhesives. Some of the processes developed to date to enhance the adhesion to polyolefins are flame treatment, corona discharge treatment, photo sensitized ultraviolet irradiation, gas plasma treatment, acid etching, electron beam irradiation and perhaps others. These processes generally enhance adhesion by either increasing wetting via oxidation (increase the critical surface tension of wetting), by cross-linking to increase surface mechanical strength, by increase in surface porosity to increase mechanical bonding by diffusion, by general surface cleaning or by combinations of these effects.

Primes have been developed for increasing adhesion to polyolefins and are generally non-polar or polar/-non-polar in nature to help provide a "bridge" between the substrate (the polyolefin) and the adhesive, coating or paint. Paints, coatings and adhesives are not necessarily always polar, but generally are, and the polar/-non-polar primer has both an affinity for the non-polar substrate and the polar paint, coating or adhesive.

The patents of Bragole U.S. Pat. Nos. 3,600,289; 3,607,536; 3,619,246; 3,627,609; 3,892,885; 4,321,307; and 4,764,370 teach various manifestations of photosensitized irradiation techniques to enhance bonding to polyolefin substrates. Such manifestations included the use of isocyanates or silanes or magnesium reacted phenolic resins with photosensitized ultra violet irradiation. Other manifestations included the presence of isocyanate at the time of photosensitized ultraviolet irradiation while others used photosensitized irradiation in combination with reactive products such as those containing isocyanates, acrylic monomers or epoxies. Some of the current techniques, while effective for some applications, produce surface changes which are not permanent. Others suffer from the fact that large quantities of hazardous waste have to be removed which is very expensive. Others suffer from universality and some are too expensive to have had widespread use.

The primers appear to be more effective with paints and coating than with adhesives. While the primer adheres well to the polyolefin it frequently suffers from inadequate adhesion to the adhesive.

I have developed a method for modifying such primers to enhance the adhesion between the primers and adhesives. The invention broadly comprises a method for bonding coatings to a polyolefin and to a polyolefin primer composition which primer has significantly enhanced bonding characteristics to the coating and preferably an adhesive coating. As used in this disclosure, polyolefin includes polyethylene, polypropylene, polybutylene, polyisoprenes and their copolymers. The primers are preferably halogenated polyolefins and are treated to form free radical species which species chemically bond to the coating, preferably an adhesive.

With this method, commercially available primers for polyolefins, such as Eastman's E343-3, E343-1, can be used. These primers inherently have excellent adhesion to polyolefin surfaces but only fair adhesion to the coatings applied to the primer. The surfaces of the primers are modified, such as by ultraviolet irradiation, for greater interactions with paints and other coatings but adhesives in particular. While ultraviolet irradiation has been used to modify polyolefin surfaces and more commonly has been used to cure coatings, generally containing unsaturated acrylic monomers, it is not believed to have been used to alter polyolefin primers. The alteration of the primer in a unique way enhances the universality of the primer and particularly enhances its adhesion to adhesives. The treatment of the primer with ultraviolet light does not necessarily cure the primer since the primer does not contain unsaturated acrylics. The treatment of the primer is believed to yield a variety of free radical species which increase the adhesion of the primer dramatically to adhesive systems.

BRIEF DESCRIPTION OF THE DRAWING

The drawing is a chart illustrating the bonding results achieved with the process of the invention.

DESCRIPTION OF THE PREFERRED EMBODIMENT

In the Example set forth herinafter, a chlorinated polypropylene primer is applied to a polypropylene substrate and irradiated.

The equations below are believed to be occurring on the primer surface during and subsequent to the irradiative event. They should, however, not be considered limitations for what is a novel technique for primer modification that increases adhesion to adhesives dramatically.

A commercially available chlorinated polypropylene primer, which has excellent adhesion to polypropylene (polyolefin surface) is used in the equations which follow:

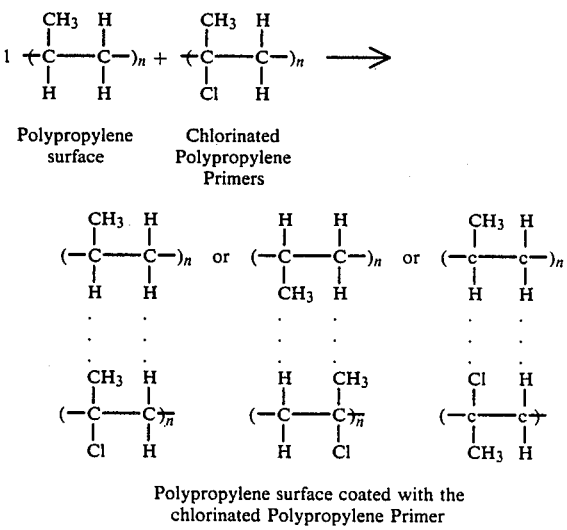

Polypropylene surface coated with the chlorinated Polypropylene Primer

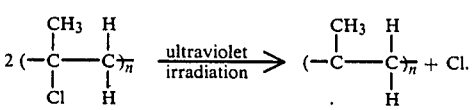

-continued

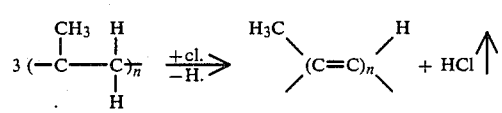

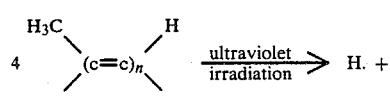

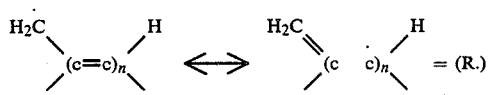

5  R. + O$_2$ $\longrightarrow$ RO$_2$.

6  RO$_2$· + R. $\longrightarrow$ RO$_2$R

7  RO$_2$· + H. $\longrightarrow$ RO$_2$W

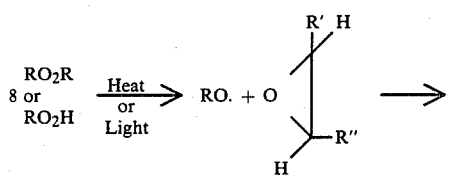

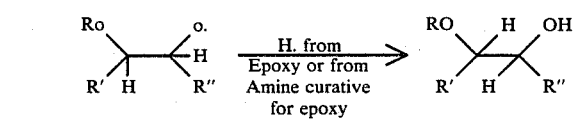

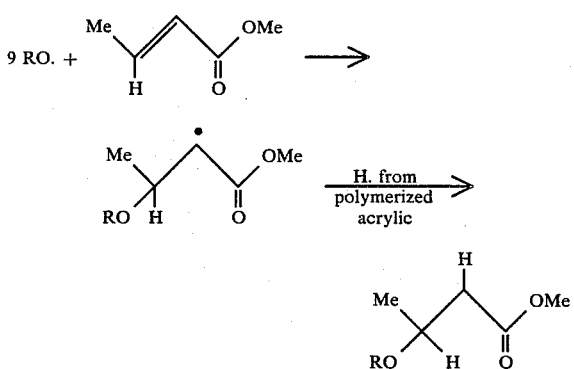

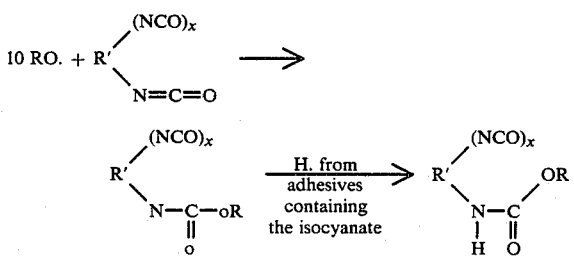

Where
X = 1-3
R = polypropylene polymers with allylic groups
R' and R" = aryl, allyl, aralkyl and/or cycloalkyl groups The affinity of the chlorinated polypropylene primer for the polypropylene substrate is shown in Eq. (1). It is believed that London dispersion forces are responsible for forming a strong union between the "like" portions of the primer and substrate. The chlorine groups may be attracted to the non-polar polypropylene substrate or may be attracted to the generally more polar paints, coatings and adhesives. Frequently, the attractive interaction between the chlorine groups in the primer and an adhesive is insufficient. It may be insufficient because the surface of the primer does not wet well. Irradiation of the primer is believed to result in some loss of chlorine which initiates a free radical reaction Eq. (2) which can provide a variety of possible end results (see, for example, Eqs. 3-7). The peroxides and hydroperoxides (RO$_2$R, RO$_2$H) shown respectively in Eq. 6 and 7 are beneficial for adhesion to an adhesive. Eq. (8) illustrates how the adhesion to an epoxy adhesive could be enhanced via the irradiation modified primer.

The primer provides the adhesion to the polypropylene as it always did but now the irradiation modified primer utilizes the heat produced during activation of the adhesive to attach itself (graft) to the epoxy adhesive Eq. (8). Heat is believed to be necessary to break the oxygen-oxygen bonds in the peroxides as shown in Eq. (8). The free radical(s) so produced can attach directly to the epoxy as shown in Eq. (8). The primer becomes engrafted to the adhesive. Grafting of a coating in the past was done to a substrate to improve adhesion to an adhesive but grafting of a primer to an adhesive is not believed to have been done before. One would not think of irradiating a saturated primer which already had adhesion to polypropylene which is why the approach is unique.

I also found that the wettability of the primer was poor before and after irradiation. This could indicate a reason for the relatively poor adhesion of the primer to the adhesive before irradiation. It could also mean that RO$_2$R, which is less polar than RO$_2$H is a more common product of oxidation after irradiation of the primer. Other adhesives that could be useful but not limiting to this technology are those containing acrylic monomers or isocyanates. Equations (9) and (10) show a similar grafting reaction of the primer directly to the acrylic monomer (Eq. 9) or isocyanate (Eq. 10).

The heat used for activation of the adhesive helps the grafting reaction by breaking down the peroxide or hydroperoxide. The heat can also help the adhesive to wet the irradiated primer since the latter shows no increase in wetting after irradiation.

EXAMPLE

The FIGURE shows some results of increased adhesion with the disclosed technique when a polyisocyanate cured polyurethane adhesive was used as a vacuum forming adhesive for attaching vinyl to polypropylene. Preferred adhesives for bonding trim, molding or stripping to the irradiated paint coatings are polyurethane adhesives. Particularly preferred polyurethane adhesives are those produced by reacting an aliphatic or aromatic diisocyanate with polyester diols and short chain diol extenders. Especially preferred are polyurethanes comprising polymers provided by reacting methylene bis-(4-phenylisocyanate) with polyester diols and short chain diol extenders selected to provide adhesive products of desired performance characteristics such as elasticity, toughness, crystallinity, etc. The polyurethanes can be prepared by way of a one-step or two-step reaction. In the two-step reaction, the diol is first reacted with the diisocyanate to provide an intermediate which is chain extended with the short chain diol. The polyurethanes produced by way of a one or two-step reaction can be compounded as required with other ingredients such as plasticizers, fillers and other polymers, etc. to provide the desired adhesive compositions. These urethane adhesive compositions cure by reaction with a second component, generally a polyisocyanate, to provide flexible thermosetting characteristics. Preferred polyester diols used in providing methylene bis-(4-phenylisocyanate) containing prepolymers are diols prepared from 1,4-butanediol adipates and/or 1,6-hexanediol adipates with typical molecular weights of the diols in the range of about 1500 to about 3000. Preferred short chain diols used for extending the methylene bis-(4-phenylisocyanate) containing prepolymers are 1,4-butane diol, ethylene glycol, diethylene glycol, etc. Preferred prepolymers are those having an isocyanate/polyester diol ratio in the range between about 1.5/1.0 to about 2.5/1.0 and a short chain diol equivalent of 0.5 to 1.5. A slight excess of isocyanate is generally preferred above stoichiometry so the final isocyanate index is approximately 1.05.

Irradiation Dosage (Times Treated Beneath the Lamp)
X = A chlorinated polypropylene primer (Eastman's E-343-3 @ 25% solids in xylene) was applied to the polypropylene prior to irradiation.
O = A chlorinated polypropylene primer (Eastman's E-343-3 @ 5% solids in xylene/toluene) was applied to the polypropylene prior to irradiation.

The polypropylene was 350 mils thick.

Irradiation was conducted with a 18.5 inch medium pressure, high intensity mercury vapor lamp emitting at 200 watts/linear inch (3700 watt lamp). Samples were placed 3–3½ inches beneath the light source on a conveyor belt traveling at a rate of 14 feet/minute. Bond strength was determined as follows: 1×6" strips of polypropylene were sprayed with the two-part polyurethane adhesive previously described. The vinyl was heated to approximately 260° F. and applied to the dried, adhesive coated polypropylene and pressed together using 20–80 psi pressure. Bonds were pulled at 12"/minute using a Scott tester. The bonds were allowed to age for at least 24 hours prior to testing.

The results are summarized below:

TABLE I

| Irradiation Dosage | Primer Concentration | Bond Strength[2]* 48 hrs. | Bond Strength[2] 48 hrs. |
|---|---|---|---|
| None (no primer) | — | — | — |
| None (primer only) | 25% | — | — |
| 1 × @ 14 ft/min. | " | — | — |
| 3 × @ 14 ft/min. | " | — | — |
| 6 × @ 14 ft/min. | " | — | — |
| 9 × @ 14 ft/min. | " | — | — |
| None (primer only) | 5% | 5.0 | 6.0 |
| 1 × @ 14 ft/min. | " | — | — |
| 3 × @ 14 ft/min. | " | — | — |
| 6 × @ 14 ft/min. | " | 17.0 | 22.0 |
| 9 × @ 14 ft/min. | " | — | — |
|  |  | Bond Strength[1] 72 hrs. | Bond Strength[2] 24 hrs. |
| None (no primer) | — | — | 0.0 |
| None (primer only) | 25% | — | 2.0 |
| 1 × @ 14 ft/min. | " | — | 6.0 |
| 3 × @ 14 ft/min. | " | — | 4.0 |
| 6 × @ 14 ft/min. | " | — | 10.0 |
| 9 × @ 14 ft/min. | " | — | 9.0 |
| None (primer only) | 5% | — | 4.0 |
| 1 × @ 14 ft/min. | " | — | 0.5 |
| 3 × @ 14 ft/min. | " | — | 0.5 |
| 6 × @ 14 ft/min. | " | 15.0 | 10.0 |
| 9 × @ 14 ft/min. | " | — | 7.5 |

*Results using Eastman's E-343-1 chlorinated polypropylene primer instead of E-343-3 concentration of E-343-1 = 5%.
[1]Higher temperature activating two-part polyurethane adhesive e.g. 160° F.
[2]Lower temperature activating two-part polyurethane adhesive e.g. 140° F.

The use of the primer alone is better, on average, without irradiation at low dosages, particularly at the 5% primer concentration. However, after exposure to the lamp 6 times, thee is a dramatic increase in bond strength at both primer concentrations. Although there is a slight downward trend at exposures greater than 6 times, it still represents a dramatic increase of bond strength. The formation of desirable peroxides or hydroperoxides appear to be more prevalent at higher radiation dosages. The slight downward bond strength trend at even higher radiation dosages (9×) could be due to the breakdown, with light, of peroxides or hydroperoxides already formed.

The vacuum forming process is ideal for the current technique since the vinyl is heated to high temperatues prior to the vacuum forming process. The heat from the vinyl breaks down the generated peroxides or hydroperoxides in the presence of the adhesive to provide a union between the primer and adhesive.

Equally good results have been found when a solvent based, two-part epoxy adhesive was used as the vacuum forming adhesive. The two-part epoxy adhesive is composed of a solid bisphenol A-type epoxy plus a vinyl resin (Part A). The curative (Part C) is composed of a polyurethane compounded polyamide resin. The mix ratio of A/C is 2/1 yielding an adhesive whose solids is approximately 30%. The adhesive has excellent wetting characteristics. Bond values in excess of 20 lbs/in. have been found with the epoxy adhesive which resulted in a rupture of the vinyl fabric. We believe that the technique is applicable for all adhesive systems but particularly those containing chemicals capable of reaction with free radical species. The adhesives can be solvent base, water base, hot melt or 100% solids liquid adhesives.

Particularly useful products would be two-part urethanes (isocyanate cured), two-part polyesters (isocyanate cured), two-part epoxies (amine or polyamide cured), self-curing or two-part acrylic adhesives. Primers containing chlorine are particularly useful in our process because of the ease with which a carbon/chlorine bond can be broken with light. Chlorinated polypropylene primers are most useful for polypropylene whereas chlorinated polyethylene primers are more useful for polyethylene. Either primer could be useful in improving the adhesion to EPDM products which are ethylene/propylene terpolymers. Although the chlorinated primers are particularly useful for reasons previously cited, any primers which can generate peroxide or hydroperoxide groups upon subsequent irradiation are useful. Those which cannot form free radicals easily to form peroxide or hydroperoxides could be catalyzed with the assistance of photosensitizers which can be incorporated directly into the primer.

Suitable sources of activating radiation may be used but ultraviolet radiation is definitely preferred. Particularly suitable ultraviolet radiation is radiation at a wave length of from about 2000 to about 3500 A and especially from about 2000 to about 2800 A. Suitable ultraviolet radiation dosages are between 0.01–1.0 Joules/cm$^2$ when measured at 3650 A and preferably between about 0.1 to about 0.2 Joules/cm$^2$. The primer may be irradiated continuously over a preselected period of time or irradiated continually for incremental periods of a preselected time. For example, the primer may be continuously irradiated for about 80 seconds or it may be subjected to four irradiations of about 20 seconds each. Irradiation for incremental periods of time minimizes thermal build-up during irradiation and can be employed if thermal built-up should be a consideration of importance. Ultraviolet irradiation suitable for the practice of the invention has been obtained using commercially available 18.5 inch, high intensity medium pressure mercury vapor lamps which operate at about 200 watts/linear inch.

In an alternative embodiment of the invention, the primer may be irradiated in the presence of a radiation photosensitizer. Ultraviolet radiation photosensitizers increase the effectiveness of the ultraviolet radiation and suitable photosensitizers include materials such as benzophenone, acetophenone, benzoin, 2-acetonaphthone, acenaphthene, fluorene, anthrone, parachlorobenzophenone, benzil and other known photosensitizers or mixtures of sensitizers, e.g. benzophenone and benzil or benzophenone and anthrone, etc. Considerations involved in selecting a suitable photosensitizer include such factors as solubility in the solvents suitable for the primer, cost, effectiveness at creating beneficial changes and availability.

Any manner for integrating the photosensitizer with the primer for irradiation can be employed so long as sufficient photosensitizer will be present to increase the effectiveness of the irradiation. Generally, the photosensitizer is applied to the primer in the form of a solution in a volatile solvent in the case of a solid photosensitizer or as a pure or diluted solution in the case of liquid photosensitizer. Methylene chloride is a particularly prefered solvent or diluent. The solution may be sprayed, wiped or otherwise applied to the primer and most commonly the amount of photosensitizer in the solution is about 0.5 to about 15% by weight and preferably about 1 to about 5% by weight. Alternatively, the photosensitizer can be include in the primer and the primer sensitizer mixture applied to the substrate.

Having described my invention, what I now claim is:

1. A method for the bonding of an adhesive to a polyolefin surface which includes:

coating the surface with a halogenated polyolefin primer, the primer being bonded to said surface;

irradiating the primer a plurality of times to maximize the formation of free radical species to increase the adhesion of the primer to an adhesive; and applying an adhesive to the primer to effect a chemical bonding between the free radical species and the adhesive.

2. The method of claim 1 wherein the polyolefin is selected from the group consisting of polyethylene, polypropylene, polybutylene, polyisoprenes and their copolymers and combinations thereof.

3. The method of claim 1 wherein the polyolefin primer consists of halogenated polyethylene, polybutylene, polypropylene, polyisoprenes and their copolymers and combinations thereof.

4. The method of claim 1 wherein the primer is a chlorinated polypropylene and where the polyolefin is polypropylene.

5. The method of claim 1 wherein the irradiating of the primer includes:
subjecting the primer to light energy in the ultraviolet range.

6. The method of claim 5 wherein the adhesive is selected from the group consisting essentially of polyurethane, epoxy and acrylic adhesives or combinations thereof.

7. The method of claim 1 wherein the free radical species comprise peroxides and hydroperoxides.

8. A polyolefin laminate which comprises a substrate of polyolefin, a halogenated polyolefin primer bonded to the polyolefin substrate, the primer characterized by free radical species which are formed by a plurality of successive doses of radiation which maximized the formation of the species, which species are adapted to chemically react with an adhesive applied thereto to form an adhesive bond between the adhesive and the primer.

9. The laminate of claim 8 wherein the polyolefins is selected from the group consisting of polyethylene, polypropylene, polybutylene, polyisoprenes and their copolymers and combinations thereof.

10. The laminate of claim 8 wherein the polyolefin primer consists of halogenated polyethylene, polybutylene, polypropylene, polyisoprenes and their copolymers and combinations thereof.

11. The laminate of claim 8 wherein the primer is a chlorinated polypropylene and where the polyolefin is polypropylene.

12. The laminate of claim 8 wherein the free radical species comprise peroxides and hydrogen peroxides.

13. The laminate of claim 8 wherein the adhesive is selected from the group consisting essentially of polyurethane, epoxy and acrylic adhesives or combinations thereof.

* * * * *